G. SIMON.
Reel and Drawer Box.

No. 216,233.    Patented June 3, 1879.

Witnesses
Otto Hufeland
William Miller

Inventor.
Gustave Simon.
by
Van Santvoord & Hauff
his attorneys.

UNITED STATES PATENT OFFICE.

GUSTAVE SIMON, OF NEW YORK, N. Y.

IMPROVEMENT IN REEL AND DRAWER BOXES.

Specification forming part of Letters Patent No. 216,233, dated June 3, 1879; application filed April 9, 1879.

*To all whom it may concern:*

Be it known that I, GUSTAVE SIMON, of the city, county, and State of New York, have invented a new and Improved Reel and Drawer Box, which invention is fully set forth in the following specification, reference being had to the accompanying drawings, in which—

Figure 1:
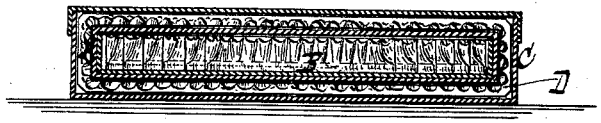
Figure 2:
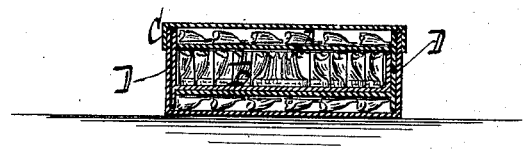
Figure 3:
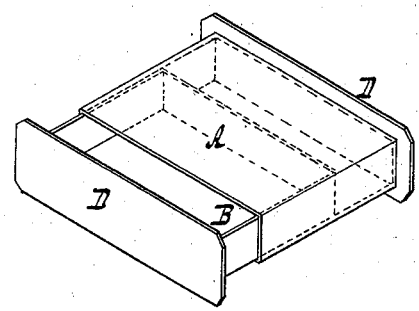

Figure 1 represents a longitudinal vertical section of a box embodying my invention. Fig. 2 is a cross-section thereof. Fig. 3 is a perspective view of the same.

Similar letters indicate corresponding parts.

My invention relates to boxes for packing ruching and other similar materials. One method of packing this class of goods is to wind the same on a broad flat reel and place the whole in a paper box, and, owing on the one hand to the loose texture of the material, and on the other to the desire to show as much as possible of the goods, a reel of large surface-area is required to carry a comparatively small amount of ruching.

The aim of my invention is to increase the capacity of a reel to carry ruching and the like, and also to adapt the same to the carrying of goods incapable of being wound, such as ladies' collars and cuffs. I accomplish this object by utilizing the space within a reel now lost—that is to say, I make use of a hollow reel open at one end, and combine therewith a drawer, both the reel and the drawer being provided with a head-piece, and the whole being fitted to a box, as hereinafter more fully set forth.

In the drawings, the letter A designates a reel, and B a drawer, combined with each other and with a box, C, according to my invention.

The reel A is hollow and open at one end, the same being, in this example, made of rectangular cross-section, and the drawer B is fitted snugly within the same, while both the reel and drawer carry a head-piece, D. The box C is of ordinary construction, and is shaped to receive the reel A—namely, to admit the head-pieces D.

It will be seen that ruching or other similar goods may be wound on the reel A, as heretofore, while the drawer B is adapted to receive a certain quantity of the same material or to receive other small goods.

The head-pieces D have two functions, one being to hold the ruching or other material wound on the reel A against lateral displacement, and the other to form handles to be taken hold of in opening or shutting the drawer.

When the reel A and drawers B have been filled with the desired goods the whole is placed in the box C, whereby the goods on the reel are protected.

I am aware that a series of cylindrical reels have been arranged to slide one within the other, and each having a head at each end, around which reels it is designed to wind laces, &c., to exhibit the same, and such I hereby disclaim.

Such an arrangement of reels is shown in the patent of G. G. Bates, dated August 26, 1873, and numbered 142,073; but in this arrangement the sliding or interior reel does not carry a head or flange which co-operates with a head or flange on the outer casing to form a double-headed reel when the boxes are closed together; and, further, in the patent referred to the interior slide is not a box or receptacle capable of receiving and holding articles which it is not desirable to wind.

In my invention, while the reel serves as a medium on which to wind the ruches, the drawer serves as a receptacle for articles that it is not desirable to rumple by winding on the reel, such as ladies' collars, cuffs, &c.

What I claim as new, and desire to secure by Letters Patent, is—

The combination, with the hollow reel A, open at one end and flanged at the other to form a head-piece, D, of the drawer B, having the flanged head D, and constructed with one open side to form a receptacle for different articles, the flanged head of the drawer forming a flanged head for the reel when in a closed position, all substantially as shown and described.

In testimony that I claim the foregoing I have hereunto set my hand and seal this 8th day of April, 1879.

GUSTAVE SIMON. [L. S.]

Witnesses:
VICTOR LEVI,
CHAS. WAHLERS.